A. KIELLAND.
FITTING FOR FASTENING REINFORCEMENT BELTS TO WOODEN PIPES OR TUBES.
APPLICATION FILED MAR. 13, 1919.
1,307,865.  Patented June 24, 1919.
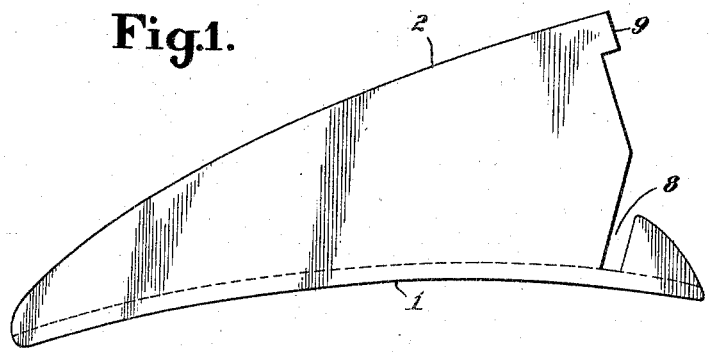
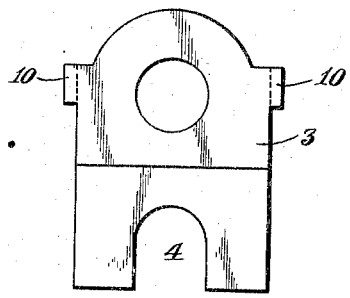
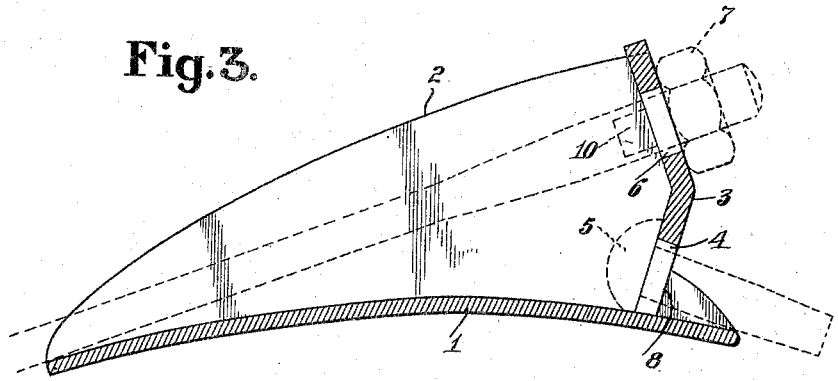
INVENTOR
Alfred Kielland

UNITED STATES PATENT OFFICE.

ALFRED KIELLAND, OF TRONDHJEM, NORWAY.

FITTING FOR FASTENING REINFORCEMENT-BELTS TO WOODEN PIPES OR TUBES.

1,307,865. Specification of Letters Patent. Patented June 24, 1919.

Application filed March 13, 1919. Serial No. 282,522.

*To all whom it may concern:*

Be it known that I, ALFRED KIELLAND, of Söndregate 17, Trondhjem, in the Kingdom of Norway, have invented certain new and useful Improvements in Fittings for Fastening Reinforcement-Belts to Wooden Pipes or Tubes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to fittings for fastening reinforcement belts to wooden pipes or tubes such as water turbine tubes and the like. Such fittings have heretofore been cast in one piece, and in a form that makes the mounting of the reinforcement belts a difficult task.

The object of my invention is to provide an improved fitting of this kind consisting of two easily detachable parts of such form as to facilitate the mounting and also to enable the fitting to be manufactured of stronger material than cast iron.

Referring to the accompanying drawings Figure 1 is a side view of the main part (the shoe) of the fitting, Fig. 2 is a front view of the locking plate and Fig. 3 is a longitudinal section of the fitting ready mounted.

The main part of the fitting (the shoe) is preferably made of sheet iron by punching and pressing or bending and is U-shaped in cross section, its bottom plate 1 being bent so as to conform to the outer curvature of the wooden tube to be reinforced, and its side walls or flanges 2 serving as an abutment for the locking plate 3, which is made as a separate, detachable piece. This plate 3 is preferably bent at an angle so that the two parts on each side of the angle line will be substantially at right angles to the respective ends of the reinforcement belt fastened to it. The lower part of the locking plate is provided with a slot 4 fitting over the shank of a bolt 5 (shown in dotted lines in Fig. 3) fastened to one end of the reinforcement belt or band. The upper part of the plate 3 is provided with a slot or aperture 6, for the other end of the reinforcement belt, said end being provided with threads for a nut 7.

The flanges 2 are provided with grooves or slots 8 for the insertion of the lower part of the plate 3, the latter being supported by these flanges and extending up to ears or projections 9 on the flanges overlapping the edge of the plate 3. These projections may, however, be dispensed with. The locking plate 3 may be provided with ears 10 (see Fig. 2, where they are seen from the end, and Fig. 3 where they are indicated in dotted lines). These ears 10 overlap the edge of the flanges 2.

It will easily be understood, that by this arrangement the advantage is obtained of an easily mounted fitting having the part exposed to the greatest stress (the plate 3) detachable, so that it may easily be readily replaced, and may also be manufactured of a stronger material than the rest of the fitting. Also the two parts of the locking plate exposed to stress in opposite or substantially opposite directions will be suitably supported by the flanges 2 on opposite sides of the slots 8.

Claims:

1. In a device for the purpose specified, the combination with a shoe comprising a base member and lateral flanges, of a locking plate removably supported by said shoe, said locking plate provided with a plurality of openings for the reception of both ends of a belt or band.

2. In fittings for fastening reinforcement belts to wooden pipes or tubes the combination of a main part or shoe, upturned flanges on said main part or shoe, a locking plate for fastening both ends of the reinforcement belt, there being slots or borings for said ends in said plate, and slots for said plate in said flanges.

3. In fittings for fastening reinforcement belts to wooden pipes or tubes the combination of a main part or shoe, upturned flanges on said main part or shoe, a locking plate for fastening both ends of the reinforcement belt, there being slots or borings for said ends in said plate, and slots for said plate in said flanges, said flanges supporting the upper part of said plate against stress in one direction, and the lower part of said plate against stress in substantially the opposite direction.

4. In fittings for fastening reinforcement belts to wooden pipes or tubes the combination of a main part or shoe, upturned flanges on said main part or shoe, a locking plate for fastening both ends of the reinforcement belt, there being slots or borings for said ends in said plate, and slots for said plate in said flanges, said flanges supporting the upper part of said plate against stress in the direction of one end of the reinforcement belt, and the lower part of said plate against stress in the direction of the other end of the reinforcement belt.

5. In a device for the purpose specified, the combination with a shoe comprising a base member and lateral flanges having slots therein, of a locking plate for a belt insertible in and removable from said slots.

6. In a device for the purpose specified, the combination with a shoe comprising a base member and lateral flanges having slots therein, of a locking plate insertible in and removable from said slots and provided with openings for the reception of the opposite ends of a belt or band, and means for retaining the locking plate in position on said slot.

In testimony that I claim the foregoing as my invention, I have signed my name in presence of two subscribing witnesses.

ALFRED KIELLAND.

Witnesses:
GEORGE F. FOREMAN,
FANNY R. JEWETT.

Copies of this patent may be obtained for five cents each, by addressing the "Commissioner of Patents, Washington, D. C."